United States Patent [19]

Elser et al.

[11] Patent Number: 4,819,757

[45] Date of Patent: Apr. 11, 1989

[54] POWER STEERING FOR MOTOR VEHICLES

[75] Inventors: Dieter Elser, Essingen; Friedemann Weiler, Böbingen, both of Fed. Rep. of Germany

[73] Assignee: Zahnradfabrik Friedrichshafen AG, Friedrichshafen, Fed. Rep. of Germany

[21] Appl. No.: 134,076

[22] Filed: Dec. 11, 1987

[30] Foreign Application Priority Data

Dec. 13, 1986 [LU] Luxembourg ............................ 00747

[51] Int. Cl.⁴ ............................................... B62D 5/00
[52] U.S. Cl. ........................................ 180/79; 180/133
[58] Field of Search ................ 180/79, 133, 161, 163, 180/156, 157, 146, 147; 280/95 R, 96

[56] References Cited

U.S. PATENT DOCUMENTS

| | | | |
|---|---|---|---|
| 3,051,257 | 8/1962 | Selle | 280/95 R |
| 3,392,797 | 7/1968 | Gibson | 180/163 X |
| 3,768,825 | 10/1973 | Magnusson | 280/96 |
| 4,109,748 | 8/1978 | Evans | 180/163 X |

Primary Examiner—John A. Pekar
Attorney, Agent, or Firm—Albert M. Zalkind

[57] ABSTRACT

Vehicles which have power steering for rotating a steering force shaft articulated via tie rods to a steering linkage can be steered by manual force steering in event of failure of the power steering. The manual force must not exceed a legal limit. The invention accomplishes this by a geometric relationship between such shaft and the pivots for tie rods which connect the shaft to the tie rods for respective steered wheels. A link to which the shaft is secured has provision for carrying tie rod end pivots at a particular distance from each other and each at a particular distance from the shaft. The distances are such that the distance between the pivots is at least 0.8 the distance from the shaft to each pivot. By such proportioning the force transmittal that effects steering becomes more indirect as the medium steering angle of steering increases. The total steering forces then become lower.

3 Claims, 1 Drawing Sheet

POWER STEERING FOR MOTOR VEHICLES

BACKGROUND OF THE INVENTION

The invention relates to an auxiliary power steering linkage for motor vehicles.

By way of regulations, certain governments such as West Germany have established special safety conditions for the authorization of steering installations. Such legislation requires in the case of the inspection of steering arrangements that the operating force to be produced by the driver at the hand steering wheel does not exceed 250 N. This is valid in the case of driving into the operating regulations circuit (BOK circuit) with a radius of 12 m. Here, it must be possible to achieve the required steering angle in 4 seconds at a speed of travel of 10 km/h from the straight ahead driving position. In order to meet this regulation, the manufacturers must equip heavy utility vehicles and buses with auxiliary power steerings. Without the auxiliary power, one will not be able to meet the previously mentioned requirements with regard to time and power. In the event of the failure of the hydraulic circuit, such legislation further requires that one will be able in the case of a travel speed of 10 km/h to drive into the BOK circuit within 6 seconds at maximal 600 N of operating force. For vehicles with high steering axle loads, these conditions cannot be met. For vehicles whose maximum speed lies above 62 km/h, a twin circuit steering arrangement has been prescribed. With a twin circuit steering arrangement, even in the case of heavy vehicles, the steerability is fully preserved in the case of the failure of a hydraulic circuit.

In an essay "Steering Arrangements for Urban Buses" of the journal "Traffic and Engineering" (V+T), year 1985, journal No. 9, especially pages 334 and 335, it has been explained that the total transmission course (steering gear and transmission parts) in the case of the customary auxiliary power steerings is designed increasingly more directly above the medium wheel steering angle (FIG. 10). As a consequence, higher steering forces are produced in the case of the failure of the hydraulics, so that even in the case of the emergency with regard to the manual power and the steering-in time, the relaxed regulations do not have to be maintained necessarily. From this it results that in the case of already relatively low steering axle loads, an expensive twin circuit steering arrangement will have to be installed in order to manage also the large steering wheel angles that are customary nowadays.

From the cited V+T essay in the journal, the horizontal insertion of a block steering gear becomes clear from picture 8, the steering drop arm of which, attached to a steering shaft, is connected at two pivotal points with the tie rods extending to the steerable wheels. The horizontal insertion offers advantages with regard to a space saving accommodation and favorable lengths of the lever for the entire steering kinematics.

The invention is based on the task of balancing the total transmission of such a auxiliary power steering device in such a way that it becomes more indirect with an increasing angle of steering.

SUMMARY OF THE INVENTION

According to the invention, the distance between the tie rods-pivotal points of the steering link or drop arm connected to the steering shaft corresponds to at least 0.8 times the distance between the steering shaft and the tie rods-pivotal points. As a result of these dimensions it will be possible to construct the total transmission above the wheel steering angle as increasingly indirectly. The operating force at the hand steering wheel decreases, so that the driver will be in a position to meet the legal requirements in the case of a failure of the hydraulic circuit, even without a twin circuit steering arrangement.

BRIEF DESCRIPTION OF THE DRAWING

An embodiment by way of example of the invention has been explained in more detail on the basis of the drawing.

DESCRIPTION OF THE PREFERRED EMBODIMENT

Figure 1:
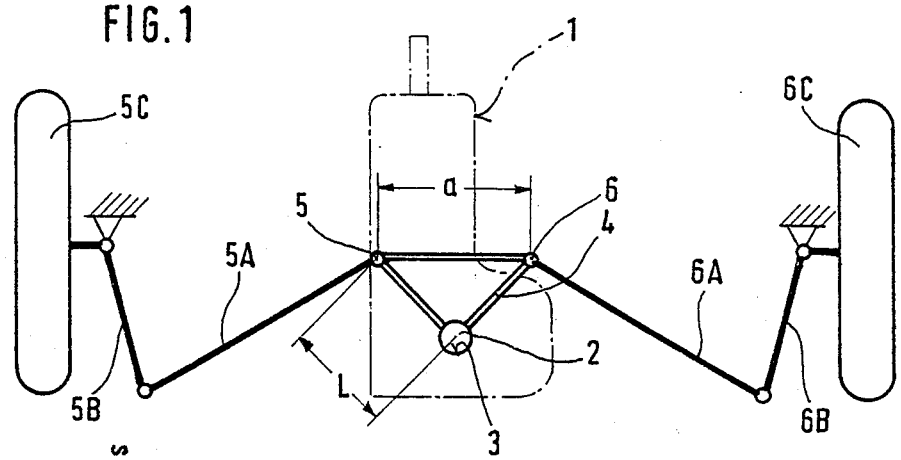
FIG. 1 shows schematically the lever kinematics of an auxiliary power steering linkage according to the invention.

FIG. 1 shows a horizontal block steering gear 1, the steering shaft 2 of which engages with a bore 3 of a steering link or drop arm 4. The steering drop arm may be triangularly or T-shaped. Tie rods 5A and 6A attached to pivotal points 5 and 6 are connected with wheel steering levers 5B and 6B. The wheel steering levers 5B and 6B move steerable wheels 5C, 6C in the case of negotiating curves.

According to the invention the distance a between the tie rods-pivotal points 5 and 6 corresponds to at least 0.8 times the distance L between the steering shaft 2 and the tie rods-pivotal points 5 and 6.

Figure 2:
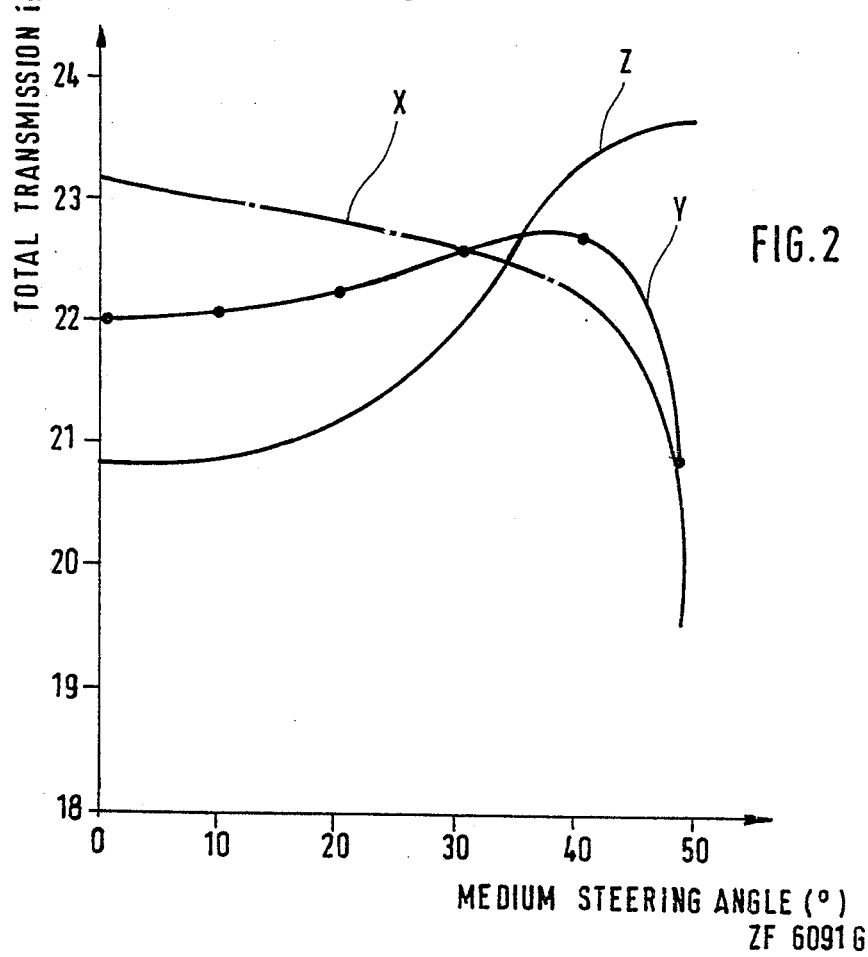
FIG. 2 shows a diagram for the course of the transmission above the medium wheel steering angle.

FIG. 2 shows with the characteristic line X the course of the transmission in the case of a customary steering kinematic (for example) FIG. 7 of the cited V+T essay). In this case, a<0.8 L. The transmission therefore will be more direct with a larger steering angle as a result of which the operating forces increase. The characteristic line Y on the other hand shows a course of the transmission $i_s$ according to the invention in the case of which the distance a=0.8 L. The transmission becomes increasingly more indirect and becomes more direct again only close to the full angle of steering (wheel angle). The characteristic line Z finally shows an additional course of the transmission at a distance of a>0.8 L. Here, the total transmission becomes increasingly more indirect over the entire steering angle to thus decrease the operating force at the steering wheel.

We claim:

1. A steering linkage for motor vehicles for manual steering when booster steering power fails and wherein the steering linkage is then actuated by manual power through a steering shaft (2) at the output end of a steering gear mechanism (1); said steering shaft having thereon a steering link (4) carrying spaced pivots (5, 6) connecting with the ends of respective tie rods (5A, 6A) having pivotal connection means (5B, 6B) to the steered wheels (5C, 6C) of a vehicle wherein the link (4), is rocked by the shaft (2) for actuating the tie rods (5A, 6A) at said pivots (5, 6);

the improvement wherein the distance (a) between the spaced pivots on the link (4) is at least 0.8 times a distance (L) between the shaft (2) and either of said pivots (5, 6) whereby the manual steering force required decreases beyond a predetermined steering angle.

2. In a steering linkage as set forth in claim 1, wherein the pivots (5, 6) are fixed spacedly at equal distances from said shaft (2).

3. In a steering linkage as set forth in claim 2, wherein said link (4) is structured to permit a triangular relationship for location of said shaft (2) and said pivots (5, 6).

* * * * *